United States Patent
Sun et al.

(10) Patent No.: US 12,518,804 B2
(45) Date of Patent: Jan. 6, 2026

(54) MEMORY AND READ CIRCUIT THEREOF

(71) Applicant: ZHEJIANG HIKSTOR TECHNOLOGY CO., LTD., Zhejiang (CN)

(72) Inventors: Haijun Sun, Zhejiang (CN); Wei Fang, Zhejiang (CN)

(73) Assignee: ZHEJIANG HIKSTOR TECHNOLOGY CO., LTD., Zhejiang (CN)

( * ) Notice: Subject to any disclaimer, the term of this patent is extended or adjusted under 35 U.S.C. 154(b) by 119 days.

(21) Appl. No.: 18/575,275

(22) PCT Filed: Aug. 11, 2022

(86) PCT No.: PCT/CN2022/111623
§ 371 (c)(1),
(2) Date: Dec. 28, 2023

(87) PCT Pub. No.: WO2023/124096
PCT Pub. Date: Jul. 6, 2023

(65) Prior Publication Data
US 2024/0355369 A1    Oct. 24, 2024

(30) Foreign Application Priority Data
Dec. 31, 2021   (CN) .......................... 202111674298.0

(51) Int. Cl.
*G11C 7/08*   (2006.01)
*G11C 7/10*   (2006.01)
*G11C 7/12*   (2006.01)

(52) U.S. Cl.
CPC .............. *G11C 7/08* (2013.01); *G11C 7/1069* (2013.01); *G11C 7/12* (2013.01)

(58) Field of Classification Search
CPC ........... G11C 7/08; G11C 7/1069; G11C 7/12; G11C 13/00; G11C 13/004; G11C 13/0026; G11C 13/0028; G11C 13/0033; G11C 2013/0042; Y02D 10/00
USPC ......................................................... 365/211
See application file for complete search history.

(56) References Cited

U.S. PATENT DOCUMENTS

2021/0027837 A1   1/2021   Kim et al.
2022/0270681 A1*  8/2022   Noguchi ............. G11C 11/1655

FOREIGN PATENT DOCUMENTS

| CN | 1734674 A | 2/2006 |
|---|---|---|
| CN | 105070735 A | 11/2015 |
| CN | 106205681 A | 12/2016 |
| CN | 112599167 A | 4/2021 |
| CN | 113593622 A | 11/2021 |

* cited by examiner

*Primary Examiner* — Fernando Hidalgo
(74) *Attorney, Agent, or Firm* — The Sun IP Law

(57) ABSTRACT

Disclosed are a memory and a read circuit thereof. The memory includes a plurality of storage arrays, where each storage array includes a first array and a second array structurally symmetrical to the first array. The read circuit of the memory includes a plurality of bit read circuits corresponding one-to-one to the plurality of storage arrays, where each bit read circuit includes a word line control circuit, a bit line control circuit and a current comparison circuit.

18 Claims, 5 Drawing Sheets

MEMORY AND READ CIRCUIT THEREOF

CROSS-REFERENCE TO RELATED APPLICATION

The disclosure claims the priority to the Chinese Patent Application No. 202111674298.0 filed with the China National Intellectual Property Administration on Dec. 31, 2021, and entitled "Memory and read circuit thereof", which is incorporated herein by reference in its entirety.

TECHNICAL FIELD

The present disclosure relates to the field of storage, in particular to a memory and a read circuit thereof.

BACKGROUND

A storage mechanism of a variable-resistance memory is implemented based on the transition of its storage device between a low-resistance state and a high-resistance state. The variable-resistance memory includes a number of storage units, each of which includes a number of storage bits (configured to store a binary bit). All of the storage bits in each storage unit simultaneously perform read or write operations. As shown in FIG. 1, each storage bit of the variable-resistance memory consists of a varistor and a metal oxide semiconductor (MOS) switching tube. The varistor is configured to store binary bits. A high-resistance state of the varistor indicates that a stored value is a binary bit "1", and a low-resistance state of the varistor indicates that a stored value is a binary bit "0". The MOS switching tube is configured to select a storage bit.

The storage bits of different storage units of a variable-resistance memory corresponding to the same position form the same storage array, and the storage bits of the same storage unit are arranged in the same position in different storage arrays. Each storage array includes a plurality of bit lines (BL) and a plurality of word lines (WL). One bit line is connected to the sources, the terminals of the varistor in the storage bits that are not connected to the MOS switching tubes, of the same column of storage bits in the storage array, and one word line is connected to the gates of the MOS switching tubes in the same row of storage bits in the storage array. The switching state of the MOS switching tubes in the storage bits can be controlled by the WL, and the level state of the storage bits can be obtained by a line connected to the BL, and then different storage bits can be selected by coupling of the WL and the BL. Each storage array selects one storage bit each time, and the storage bit selected is determined by a read address received by the variable-resistance memory.

All storage bits on each BL of the variable-resistance memory share one current comparison circuit, and the current comparison circuit is used for comparing a current obtained from the connected BL with a preset reference current. If the obtained current is less than the preset reference current, it indicates that the selected storage bit on the BL is in a high-resistance state, and then a signal indicating that the stored value of the currently selected storage bit is a binary bit "1" is output. If the obtained current is greater than the preset reference current, it indicates that the selected storage bit on the BL is in a low-resistance state, and then a signal indicating that the stored value of the currently selected storage bit is a binary bit "0" is output. So the stored data is read from the variable-resistance memory.

As the capacity of the variable-resistance memory gradually increases, the length of the BL also increases. The increase in length of the BL implies an increase in the number of storage bits in a common current comparison circuit, which will cause negative effects. When a storage bit on a BL is read, although the MOS switching tubes in other storage bits on the BL are in a turned-off state, subthreshold leakage currents (trace leakage currents between sources and drains when the MOS switching tubes are in a shutdown region) exist on these MOS switching tubes. These subthreshold leakage currents are accumulated on the BL and affect a current obtained from the BL by the current comparison circuit. The larger the length of BL is, the greater the impact is. Moreover, the subthreshold leakage current is affected by temperature. The subthreshold leakage current at a high temperature is higher than that at a low temperature, so even if the number of stored bits on the BL is constant, the current obtained by the current comparison circuit from the BL will change. However, in different scenes, the preset reference current of the current comparison circuit is fixed, so the stored values of the same stored bit read in different scenes may be different, which reduces the reading accuracy of the variable-resistance memory.

Therefore, how to provide a solution to the above technical problems is an issue to be solved by those skilled in the art.

SUMMARY

An embodiment of the present disclosure provides a read circuit of a memory. The read circuit is applied to the memory including a plurality of storage arrays. Each of the plurality of storage array includes a first array and a second array structurally symmetrical to the first array; the read circuit of the memory includes a plurality of bit read circuits corresponding one-to-one to the plurality of storage arrays; and each of the plurality of bit read circuit includes:
  a word line control circuit and a bit line control circuit separately connected to a target storage array correspondingly read; and
  a current comparison circuit connected to the bit line control circuit.

In an embodiment, the word line control circuit is connected to word lines of a first target array and word lines of a second target array in the target storage array separately, and is configured to control a target word line where a target storage bit to be selected is located to close a first switching tube in the target storage bit; and
  the bit line control circuit is connected to bit lines of the first target array and bit lines of the second target array separately, and is configured to control a first bit line where the target storage bit is located and a second bit line which is structurally symmetrical to the first bit line to be connected.

In an embodiment, the bit line control circuit includes:
  a plurality of second switching tubes arranged on a plurality of the bit lines of the first target array and a plurality of the bit lines of the second target array one by one, where a first end of each second switching tube is connected to a source of a storage bit of a bit line where the second switching tube is arranged, and a second end of the each second switching tube is connected to the current comparison circuit; and
  a switching control circuit connected to control ends of the plurality of the second switching tubes separately, and configured to control the second switching tubes arranged on the first bit line and the second bit line to be closed, so as to connect the first bit line to the second bit line.

In an embodiment, the current comparison circuit includes:
  a first current comparison sub-circuit connected to the second ends of the plurality of second switching tubes separately, configured to enter an operating state when the target storage bit is located in the first target array, so as to obtain a first current on the first bit line and a second current on the second bit line, and configured to generate a first signal indicating that a stored value of the target storage bit is 1 in case that a current value obtained by superimposing a preset reference current on the second current is greater than the first current, and otherwise, generate a second signal indicating that the stored value of the target storage bit is 0; and
  a second current comparison sub-circuit connected to the second ends of the plurality of second switching tubes separately, configured to enter an operating state when the target storage bit is located in the second target array, so as to obtain the first current and the second current, and configured to generate the first signal in case that a current value obtained by superposing the preset reference current on the second current is greater than the first current, and otherwise, generate the second signal.

In an embodiment, the first current comparison sub-circuit includes a first switching device, a second switching device, a first reference resistor, and a first current sense amplifier, where
  a first end of the first switching device is connected to the second ends of the plurality of second switching tubes corresponding to the first target array separately, a second end of the first switching device is connected to a negative input end of the first current sense amplifier, a first end of the second switching device is connected to the second ends of the plurality of second switching tubes corresponding to the second target array separately, a second end of the second switching device is connected to a positive input end of the first current sense amplifier and a first end of the first reference resistor separately, and a second end of the first reference resistor is grounded; the first switching device and the second switching device are closed when the target storage bit is located in the first target array and are opened when the target storage bit is located in the second target array; and
  the first current sense amplifier is configured to output a high level signal indicating that the stored value of the target storage bit is 1 in case that a current at the positive input end of the first current sense amplifier is greater than a current at the negative input end of the first current sense amplifier, and otherwise, output a low level signal indicating that the stored value of the target storage bit is 0.

In an embodiment, the first current comparison sub-circuit further includes a third switching tube and a fourth switching tube, where
  A first end of the third switching tube Is connected to the second end of the first switching device, a second end of the third switching tube is connected to the negative input end of the first current sense amplifier, a control end of the third switching tube is connected to a first voltage, a first end of the fourth switching tube is connected to the first end of the first reference resistor and the second end of the second switching device separately, a second end of the fourth switching tube is connected to the positive input end of the first current sense amplifier, and a control end of the fourth switching tube is connected to a second voltage; and resistance values on lines where the third switching tube and the fourth switching tube are located are correspondingly adjusted by adjusting the first voltage and the second voltage.

In an embodiment, the second current comparison sub-circuit includes a third switching device, a fourth switching device, a second reference resistor, and a second current sense amplifier, where
  a first end of the third switching device is connected to the second ends of the plurality of second switching tubes corresponding to the second target array separately, a second end of the third switching device is connected to a negative input end of the second current sense amplifier, a first end of the fourth switching device is connected to the second ends of the plurality of second switching tubes corresponding to the first target array separately, a second end of the fourth switching device is connected to a positive input end of the second current sense amplifier and a first end of the second reference resistor separately, and a second end of the second reference resistor is grounded; the third switching device and the fourth switching device are closed when the target storage bit is located in the second target array and are opened when the target storage bit is located in the first target array; and
  the second current sense amplifier is configured to output a high level signal indicating that the stored value of the target storage bit is 1 in case that a current at the positive input end of the second current sense amplifier is greater than a current at the negative input end of the second current sense amplifier, and otherwise, output a low level signal indicating that the stored value of the target storage bit is 0.

In an embodiment, the second current comparison sub-circuit further includes a fifth switching tube and a sixth switching tube, where
  a first end of the fifth switching tube is connected to the second end of the third switching device, a second end of the fifth switching tube is connected to the negative input end of the second current sense amplifier, a control end of the fifth switching tube is connected to the first voltage, a first end of the sixth switching tube is connected to the first end of the second reference resistor and the second end of the fourth switching device separately, a second end of the sixth switching tube is connected to the positive input end of the second current sense amplifier, a control end of the sixth switching tube is connected to the second voltage; and resistance values on lines where the fifth switching tube and the sixth switching tube are located are correspondingly adjusted by adjusting the first voltage and the second voltage.

In an embodiment, the first switching device, the second switching device, the third switching device and the fourth switching device are transmission gates.

Another embodiment of the present disclosure further provides a memory, including a plurality of storage arrays and any one of the read circuits of a memory.

In an embodiment, the memory is a phase change memory, a magnetic random-access memory or a resistive random-access memory.

BRIEF DESCRIPTION OF THE DRAWINGS

In order to explain the technical solutions in examples of the present disclosure more clearly, the accompanying drawings required in the prior art and the examples will be described below briefly. Apparently, the accompanying drawings in the following description show merely some examples of the present disclosure, and other drawings can be derived from these accompanying drawings by those of ordinary skill in the art without creative efforts.

DETAILED DESCRIPTION OF THE EMBODIMENTS

A core of the present disclosure is to provide a memory and a read circuit thereof, which can offset a subthreshold leakage current led to a bit line, so as to avoid a situation that stored values of a same storage bit read in different scenes are different, such that reading accuracy of a variable-resistance memory is improved.

In order to make the objectives, technical solutions, and advantages of the examples of the present disclosure clearer, the technical solutions in the examples of the present disclosure will be clearly and completely described below in conjunction with the accompanying drawings in the examples of the present disclosure. Apparently, the described examples are some examples rather than all examples of the present disclosure. Based on the examples of the present disclosure, all other examples acquired by those of ordinary skill in the art without making creative efforts fall within the scope of protection of the present disclosure.

Figure 1:
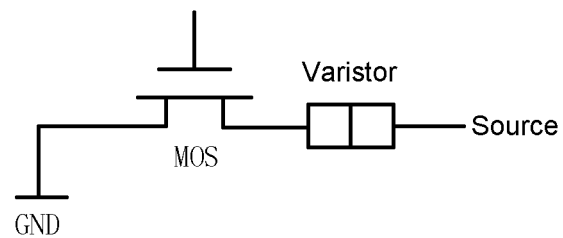
FIG. 1 is a schematic structural diagram of a storage bit in the prior art.
Figure 2:
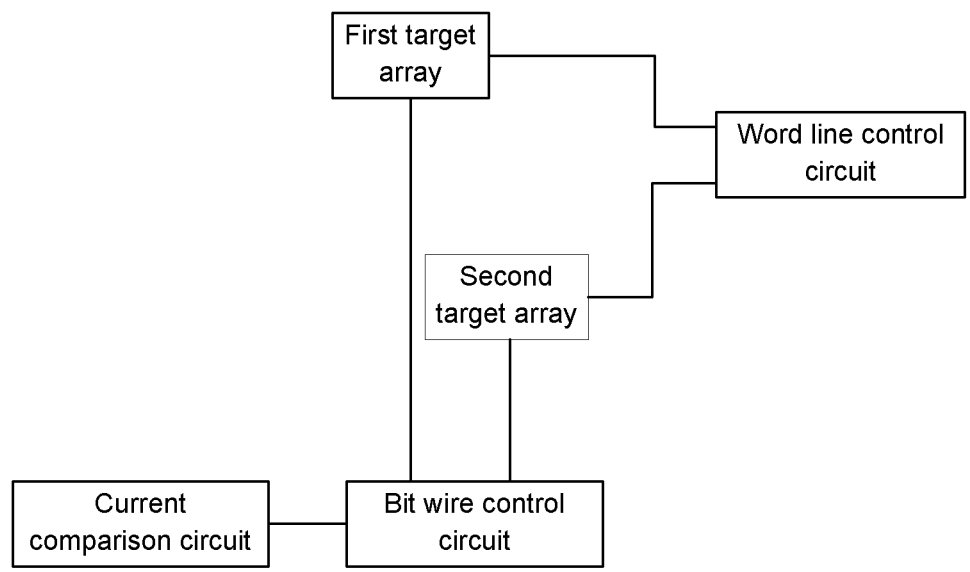
FIG. 2 is a schematic structural diagram of a read circuit of a memory according to an example of the present disclosure.

With reference to FIG. 2, FIG. 2 is a schematic structural diagram of a read circuit of a memory according to an example of the present disclosure.

The read circuit of a memory is applied to the memory (a variable-resistance memory such as phase change memory, a magnetic random-access memory or a resistive random-access memory) including a plurality of storage arrays. Each of the plurality of storage array includes a first array and a second array structurally symmetrical to the first array. The read circuit of a memory includes a plurality of bit read circuits corresponding one-to-one to the plurality of storage arrays. Each of the plurality of bit read circuit includes:

a word line control circuit 100 separately connected to word lines of a first target array and a second target array in a target storage array correspondingly read, and configured to control a target word line where a target storage bit to be selected is located to close a first switching tube in the target storage bit;

a bit line control circuit 200 connected to bit lines of the first target array and the second target array separately, and configured to control a first bit line where the target storage bit is located and a second bit line which is structurally symmetrical to the first bit line to be connected; and a current comparison circuit 300 connected to the bit line control circuit 200, configured to obtain a first current on the first bit line and a second current on the second bit line, and configured to generate a first signal indicating that a stored value of the target storage bit is 1 in case that a current value obtained by superimposing a preset reference current on the second current is greater than the first current, and otherwise, generate a second signal indicating that the stored value of the target storage bit is 0.

Specifically, the memory of the disclosure includes a plurality of storage arrays (the storage bits of different storage units of the memory corresponding to the same position form the same storage array, and the storage bits of the same storage unit are arranged in the same position in different storage arrays), each storage array includes a first array and a second array, and the first array and the second array are structurally symmetrical.

The reading circuit of a memory includes a plurality of bit read circuits corresponding one-to-one to the plurality of storage arrays. Each bit read circuit is configured to read a stored value of each storage bit in the corresponding storage array. Each bit read circuit only reads a stored value of one storage bit in the corresponding storage array at a time. Since all storage bits in each storage unit are read out or written in simultaneously, the plurality of bit read circuit reads the storage bits of the same storage unit one by one each time, so as to read the stored values of each storage unit in the memory.

In view of this, each bit read circuit includes a word line control circuit 100, a bit line control circuit 200 and a current comparison circuit 300.

The word line control circuit 100 is separately connected to word lines of a first array (referred to as a first target array) and a second array (referred to as a second target array) in a storage array (referred to as a target storage array) correspondingly read. The word line control circuit 100 may control a word line (referred to as a target word line) where a storage bit to be selected (referred to as a target storage bit) is located to close a first switching tube in the target storage bit (actually, all switching tubes connected to the target word line are closed).

The bit line control circuit 200 is connected to bit lines of the first target array and the second target array separately. The target word line may control a bit line (referred to as a first bit line) where the target storage bit is located and a bit line (referred to as a second bit line) which is structurally symmetrical to the first bit line to be connected. In case that the target storage bit is located in the first target array, the first bit line is a bit line in the first target array, the second bit line is a bit line in the second target array, and the first bit line and the second bit line are structurally symmetrical. In case that the target storage bit is located in the second target array, the first bit line is a bit line in the second target array, the second bit line is a bit line in the first target array, and the first bit line and the second bit line are structurally symmetrical.

The current comparison circuit 300 is connected to the bit line control circuit 200. The current comparison circuit 300 may obtain a current (referred to as a first current) on the first bit line and a current (referred to as a second current) on the second bit line, superposes the second current on the second bit line on a preset reference current, so as to obtain a reference correction current, and then compares the reference correction current with the first current on the first bit line. In case that the reference correction current is greater than the first current, it is indicated that the selected target storage bit on the first bit line is in a high-resistance state, and a first signal indicating that a stored value of the target storage bit is 1 is generated. In case that the reference correction current is less than the first current, it is indicated that the selected target storage bit on the first bit line is in a low-resistance state, and a second signal indicating that the stored value of the target storage bit is 0 is generated.

Figure 3:
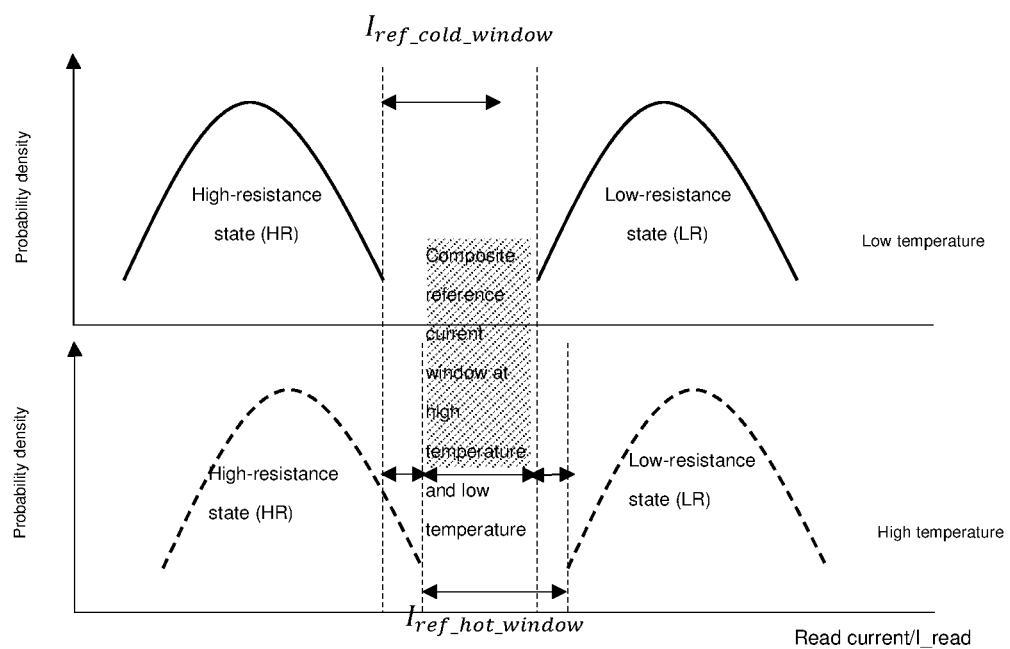
FIG. 3 is a comparison diagram of a read reference current window according to an example of the present disclosure at different temperatures.

It should be noted that the reason why an existing read circuit of a memory may read different values of the same storage bit in different scenes is that a subthreshold leakage current is influenced by a temperature. A subthreshold leakage current at a high temperature is higher than a subthreshold leakage current at a low temperature, such that a condition under which bit data is accurately indicated at a high temperature is $I_{tata\_HR}+I_{tata\_Ikg\_hot}<I_{ref}<I_{data\_LR}+I_{data\_Ikg\_hot}$; a condition under which bit data is accurately indicated at a low temperature is: $I_{tata\_HR}+I_{data\_Ikg\_cold}<I_{ref}<I_{data\_LR}+I_{data\_Ikg\_cold}$ ($I_{data\_Ikg\_hot}>I_{data\_Ikg\_cold}$); and a condition under which bit data is accurately indicated at high and low temperatures is $I_{ref\_window}=I_{ref\_cold\_window} \cap I_{ref\_hot\_window}$; where $I_{data\_HR}$ is a current accumulated on the bit line by the selected first storage bit when the first storage bit is in a high-resistance state; $I_{data\_Ikg\_hot}$ is a subthreshold leakage current accumulated on the bit line where the first storage bit is located at a high temperature; $I_{ref}$ is the preset reference current; $I_{data\_LR}$ is a current accumulated on the bit line by the selected first storage bit when the first storage bit is in a low-resistance state; $I_{data\_Ikg\_cold}$ is a subthreshold leakage current accumulated on the bit line where the first storage bit is located at a low temperature; $I_{ref\_cold\_window}$ is a first read reference current window of the reference current $I_{ref}$ at a low temperature; $I_{ref\_hot\_window}$ is a second read reference current window of the reference current $I_{ref}$ at a high temperature; and $I_{ref\_window}$ is an intersection of the first read reference current window and the second read reference current window, that is, a composite reference current window at high and low temperatures (with reference to FIG. 3). As can be seen from FIG. 3, since the read reference current windows are inconsistent at different temperatures due to a leakage current variation at high and low temperatures, when the reference current $I_{ref}$ is set at a non-coincident position of the first read reference current window and the second read reference current window, the stored values of the same storage bit read at different temperature scenes are different.

In the read circuit of a memory of the disclosure, it can be understood that the second current on the second bit line is formed by accumulation of subthreshold leakage currents of the switching tubes in the storage bits on the second bit line, and the second current can approximately offset the sub-threshold leakage currents led to the first current on the first bit line. Therefore, the problem that the read reference current windows are inconsistent at different temperatures due to a leakage current variation at high and low temperatures is eliminated, and the situation the stored values of the same storage bit read at different scenes are different is avoided.

It should also be noted that, since the plurality of bit read circuits read storage bits of the same storage unit one by one each time, and the arrangement positions of the storage bits of the same storage unit in different storage arrays are the same, that is, the arrangement positions of the storage bits selected each time in different storage arrays are the same, the plurality of bit read circuits can share the word line control circuit 100 and the bit line control circuit 200, to save circuit cost.

Therefore, the disclosure provides a read circuit of a memory. The read circuit is applied to the memory including a plurality of storage arrays. Each storage array includes a first array and a second array structurally symmetrical to the first array; the read circuit of the memory includes a plurality of bit read circuits corresponding one-to-one to the plurality of storage arrays; and each bit read circuit includes a word line control circuit, a bit line control circuit and a current comparison circuit. The bit read circuit can offset a subthreshold leakage current led to a bit line, so as to avoid a situation that stored values of a same storage bit read in different scenes are different, such that reading accuracy of a variable-resistance memory is improved.

Figure 4:
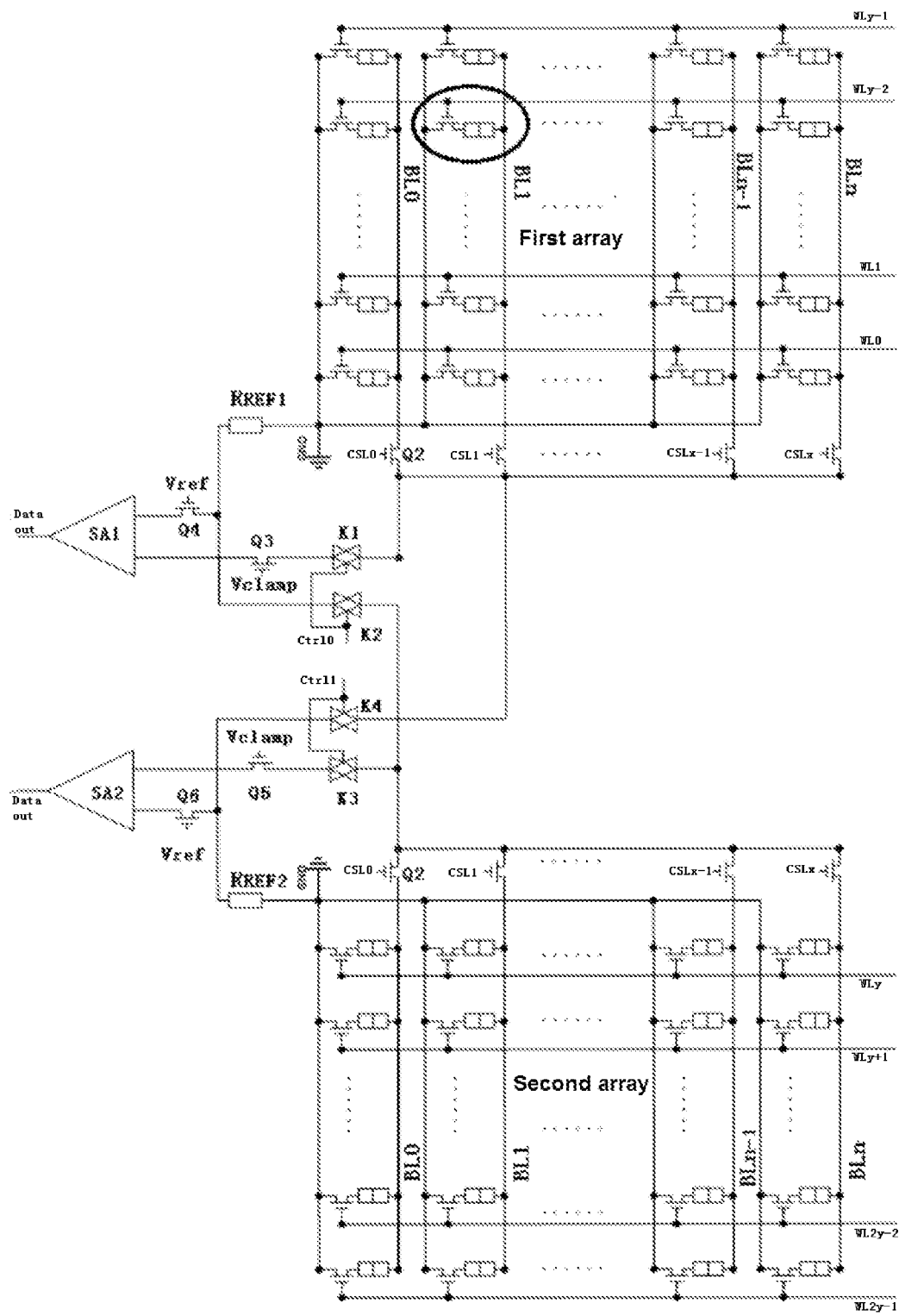
FIG. 4 is a schematic diagram of a specific structure of a read circuit of a memory according to an example of the present disclosure.

On the basis of the above example, with reference to FIG. 4, FIG. 4 is a schematic diagram of a specific structure of a read circuit of a memory according to an example of the present disclosure.

As an alternative example, the bit line control circuit 200 includes:

a plurality of second switching tubes Q2 arranged on the plurality of bit lines of the first target array and the second target array one by one, where a first end of each second switching tube Q2 is connected to a source of a storage bit of a bit line where the second switching tube is arranged, and a second end of each second switching tube Q2 is connected to the current comparison circuit 300; and a switching control circuit connected to control ends of the plurality of second switching tubes Q2 separately, and configured to control the second switching tubes Q2 arranged on the first bit line and the second bit line to be closed, so as to connect the first bit line to the second bit line.

Specifically, the bit line control circuit 200 in the disclosure includes a plurality of second switching tubes Q2 and a switching control circuit. A working principle is as follows.

The plurality of second switching tubes Q2 are arranged on the plurality of bit lines of the first target array and the second target array one by one, and the switching states of the plurality of second switching tubes Q2 are controlled by the switching control circuit. The switching control circuit is configured to control the second switching tubes Q2 arranged on the first bit line where the selected target storage bit is located and the second bit line which is structurally symmetrical to the first bit line to be closed, so as to connect the first bit line and the second bit line.

As an alternative example, the current comparison circuit 300 includes:

a first current comparison sub-circuit connected to the second ends of the plurality of second switching tubes Q2 separately, configured to enter an operating state when the target storage bit is located in the first target array, so as to obtain a first current and a second current, and configured to generate a first signal in case that a current value obtained by superimposing a preset reference current on the second current is greater than the first current, and otherwise, generate a second signal; and a second current comparison sub-circuit connected to the second ends of the plurality of second switching tubes Q2 separately, configured to enter an operating state when the target storage bit is located in the second target array, so as to obtain the first current and the second current, and configured to generate the first signal in case that a current value obtained by superimposing the preset reference current on the second current is greater than the first current, and otherwise, generate the second signal.

Specifically, the current comparison circuit 300 in the disclosure includes a first current comparison sub-circuit and a second current comparison sub-circuit. A working principle is as follows.

When the selected target storage bit is located in the first target array, the first current comparison sub-circuit enters an operating state (in this case, the second current comparison sub-circuit does not operate). When the selected target storage bit is located in the second target array, the second current comparison sub-circuit enters an operating state (in this case, the first current comparison sub-circuit does not operate). The first current comparison sub-circuit and the second current comparison sub-circuit have the same working principle when working: the first current on the first bit line and the second current on the second bit line are obtained, the second current on the second bit line is superposed with the preset reference current to obtain a reference correction current, the reference correction current is compared with the first current on the first bit line, and the first signal indicating that a stored value of the target storage bit is 1 is generated in case that the reference correction current is greater than the first current; and the second signal indicating that the stored value of the target storage bit is 0 is generated in case that the reference correction current is less than the first current.

As an alternative example, the first current comparison sub-circuit includes a first switching device K1, a second switching device K2, a first reference resistor $R_{REF1}$, and a first current sense amplifier SA1.

A first end of the first switching device K1 is connected to the second ends of the plurality of second switching tubes Q2 corresponding to the first target array separately, and a second end of the first switching device K1 is connected to a negative input end of the first current sense amplifier SA1. A first end of the second switching device K2 is connected to the second ends of the plurality of second switching tubes Q2 corresponding to the second target array separately, and a second end of the second switching device K2 is connected to a positive input end of the first current sense amplifier SA1 and a first end of the first reference resistor $R_{REF1}$ separately. A second end of the first reference resistor $R_{REF1}$ is grounded. The first switching device K1 and the second switching device K2 are closed when the target storage bit is located in the first target array and are opened when the target storage bit is located in the second target array.

The first current sense amplifier SA1 is configured to output a high level signal indicating that the stored value of the target storage bit is 1 in case that a current at the positive input end of the first current sense amplifier is greater than a current at the negative input end of the first current sense amplifier, and otherwise, output a low level signal indicating that the stored value of the target storage bit is 0.

Specifically, the first current comparison sub-circuit in the disclosure includes a first switching device K1, a second switching device K2, a first reference resistor $R_{REF1}$, and a first current sense amplifier SA1. A working principle is as follows.

The first switching device K1 and the second switching device K2 are closed when the target storage bit is located in the first target array and opened when the target storage bit is located in the second target array, such that the first current comparison sub-circuit enters the operating state when the target storage bit is located in the first target array.

A reference correction current is obtained by superimposing a reference current generated by the first reference resistor $R_{REF1}$ on the second current on the second bit line and is input to the positive input end of the first current sense amplifier SA1. The first current on the first bit line is input to the negative input end of the first current sense amplifier SA1. The first current sense amplifier SA1 outputs the high level signal indicating that the stored value of the target storage bit is 1 when the reference correction current is greater than the first current, and outputs the low level signal indicating that the stored value of the target storage bit is 0 when the reference correction current is less than the first current.

As an alternative example, the first current comparison sub-circuit further includes a third switching tube Q3 and a fourth switching tube Q4.

A first end of the third switching tube Q3 is connected to the second end of the first switching device K1, a second end of the third switching tube Q3 is connected to the negative input end of the first current sense amplifier SA1, and a control end of the third switching tube Q3 is connected to a first voltage. A first end of the fourth switching tube Q4 is connected to the first end of the first reference resistor $R_{REF1}$ and the second end of the second switching device K2 separately, a second end of the fourth switching tube Q4 is connected to the positive input end of the first current sense amplifier SA1, and a control end of the fourth switching tube Q4 is connected to a second voltage. Resistance values on lines where the third switching tube Q3 and the fourth switching tube Q4 are located are correspondingly adjusted by adjusting the first voltage and the second voltage.

Further, the first current comparison sub-circuit in the disclosure further includes a third switching tube Q3 and a fourth switching tube Q4. A working principle is as follows.

The third switching tube Q3 and the fourth switching tube Q4 are mainly used for adjusting a set value of the reference current during early debugging. A resistance value of the third switching tube Q3 may be adjusted by adjusting a voltage value of the first voltage ($V_{ref}$) connected to the control end of the third switching tube Q3, that is, a resistance value of a line where the third switching tube Q3 is located is adjusted, which is equivalent to that a current value of the line where the third switching tube Q3 is located is adjusted. Similarly, a resistance value of the fourth switching tube Q4 may be adjusted by adjusting a voltage value of the second voltage (Vclamp) connected to the control end of the fourth switching tube Q4, that is, a resistance value of a line where the fourth switching tube Q4 is located is adjusted, which is equivalent to that a current value of the line where the fourth switching tube Q4 is located is adjusted. It can be understood that circuit parameters of the first current comparison sub-circuit may be designed as long as bit data can be accurately indicated.

As an alternative example, the second current comparison sub-circuit includes a third switching device K3, a fourth switching device K4, a second reference resistor $R_{REF2}$, and a second current sense amplifier SA2.

A first end of the third switching device K3 is connected to the second ends of the plurality of second switching tubes Q2 corresponding to the second target array separately, and a second end of the third switching device K3 is connected to a negative input end of the second current sense amplifier SA2. A first end of the fourth switching device K4 is connected to the second ends of the plurality of second switching tubes Q2 corresponding to the first target array separately, and a second end of the fourth switching device K4 is connected to a positive input end of the second current sense amplifier SA2 and a first end of the second reference resistor $R_{REF2}$ separately. A second end of the second reference resistor $R_{REF2}$ is grounded. The third switching device K3 and the fourth switching device K4 are closed when the target storage bit is located in the second target array and are opened when the target storage bit is located in the first target array.

The second current sense amplifier SA2 is configured to output a high level signal indicating that the stored value of the target storage bit is 1 in case that a current at the positive input end of the first current sense amplifier is greater than a current at the negative input end of the first current sense amplifier, and otherwise, output a low level signal indicating that the stored value of the target storage bit is 0.

Specifically, the second current comparison sub-circuit in the disclosure includes a third switching device K3, a fourth switching device K4, a second reference resistor $R_{REF2}$, and a second current sense amplifier SA2. A working principle is as follows.

The third switching device K3 and the fourth switching device K4 are closed when the target storage bit is located in the second target array and opened when the target storage bit is located in the first target array, such that the second current comparison sub-circuit enters the operating state when the target storage bit is located in the second target array.

A reference correction current is obtained by superimposing a reference current generated by the second reference resistor $R_{REF2}$ on the second current on the second bit line and is input to the positive input end of the second current sense amplifier SA2. The first current on the first bit line is input to the negative input end of the second current sense amplifier SA2. The second current sense amplifier SA2 outputs the high level signal indicating that the stored value of the target storage bit is 1 when the reference correction current is greater than the first current, and outputs the low level signal indicating that the stored value of the target storage bit is 0 when the reference correction current is less than the first current.

As an alternative example, the second current comparison sub-circuit further includes a fifth switching tube Q5 and a sixth switching tube Q6.

A first end of the fifth switching tube Q5 is connected to the second end of the third switching device K3, a second end of the fifth switching tube Q5 is connected to the negative input end of the second current sense amplifier SA2, and a control end of the fifth switching tube Q5 is connected to the first voltage. A first end of the sixth switching tube Q6 is connected to the first end of the second reference resistor $R_{REF2}$ and the second end of the fourth switching device K4 separately, a second end of the sixth switching tube Q6 is connected to the positive input end of the second current sense amplifier SA2, and a control end of the sixth switching tube Q6 is connected to the second voltage. Resistance values on lines where the fifth switching tube Q5 and the sixth switching tube Q6 are located are correspondingly adjusted by adjusting the first voltage and the second voltage.

Further, the second current comparison sub-circuit in the disclosure further includes a fifth switching tube Q5 and a sixth switching tube Q6. A working principle is as follows.

The fifth switching tube Q5 and the sixth switching tube Q6 are mainly used for adjusting a set value of the reference current during early debugging. A resistance value of the fifth switching tube Q5 may be adjusted by adjusting a voltage value of the first voltage connected to the control end of the fifth switching tube Q5, that is, a resistance value of a line where the fifth switching tube Q5 is located is adjusted, which is equivalent to that a current value of the line where the fifth switching tube Q5 is located is adjusted. Similarly, a resistance value of the sixth switching tube Q6 may be adjusted by adjusting a voltage value of the second voltage connected to the control end of the sixth switching tube Q6, that is, a resistance value of a line where the sixth switching tube Q6 is located is adjusted, which is equivalent to that a current value of the line where the sixth switching tube Q6 is located is adjusted. It can be understood that circuit parameters of the second current comparison sub-circuit may be designed as long as bit data can be accurately indicated.

As an alternative example, the first switching device K1, the second switching device K2, the third switching device K3 and the fourth switching device K4 are transmission gates.

As an alternative example, the first switching device K1, the second switching device K2, the third switching device K3 and the fourth switching device K4 in the disclosure may be selected as transmission gates, and other switching devices may also be selected, which is not particularly limited herein.

Moreover, metal oxide semiconductor (MOS) tubes (specifically negative-channel metal oxide semiconductor (NMOS) tubes) can be selected as switching tubes in the read circuit of a memory in the disclosure, and other switching tubes can also be selected, which is not particularly limited herein.

In summary, as shown in FIG. 4, an address range of the word lines of the first array is 0–(y–1), and an address range of the word lines of the second array is y–(2y–1). When the target storage bit of the first array is accessed, in case that a valid word line is $WL_{y-2}$ and a valid bit line is $BL_1$, $BL_1$ of the second array is also valid, that is, the NMOS CSL1 is closed. Meanwhile, a control signal ctrl0 of transmission gates located in the first array is valid, that is, the transmission gate K1 and the transmission gate K2 are in a connected state. A control signal ctrl1 of transmission gates located in the second array is invalid, that is, the transmission gate K3 and the transmission gate K4 are in a disconnected state. A simplified circuit is shown in FIG. 5.

In this case, the first reference resistor $R_{REF1}$ of the reference end (positive input end) of the first current sense amplifier SA1 is connected in parallel to y storage bit structures in the same bit line address in the second array. During reading, when a leakage current $I_{1kg\_data}$ exists in other (y–1) storage bit structures on $BL_1$ where the target storage bit is located in the accessed first array, almost the same leakage current is led to the reference end of the first sense amplifier since almost the same number of storage bit structures are connected in parallel to the reference end, and the leakage currents of the two parts have the same temperature features, such that an influence caused by other leakage currents with switching tubes not opened on $BL_1$ in the first array can be offset.

Figure 5:
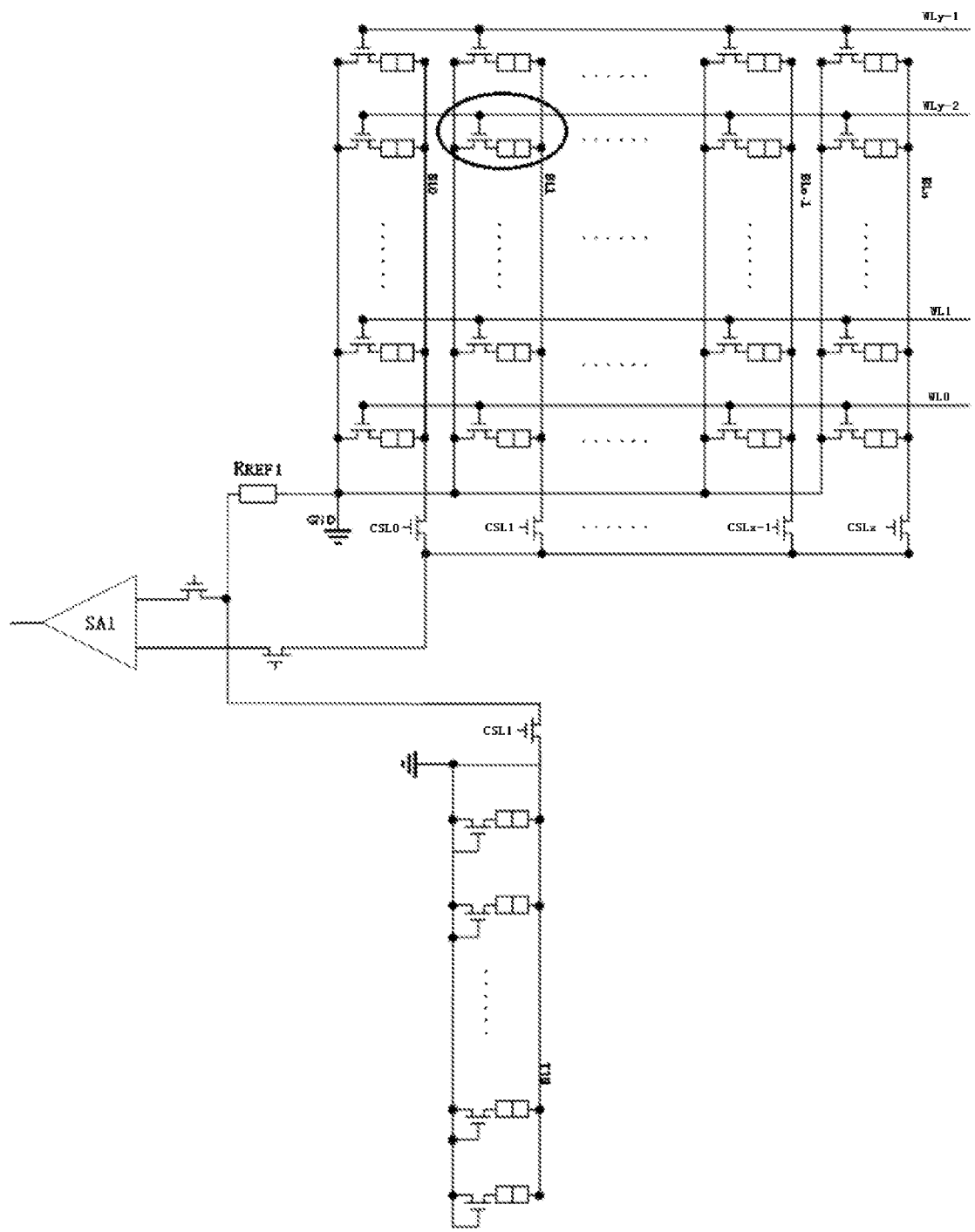
FIG. 5 is a diagram of a working principle of a read circuit of a memory according to an example of the present disclosure.
Figure 6:
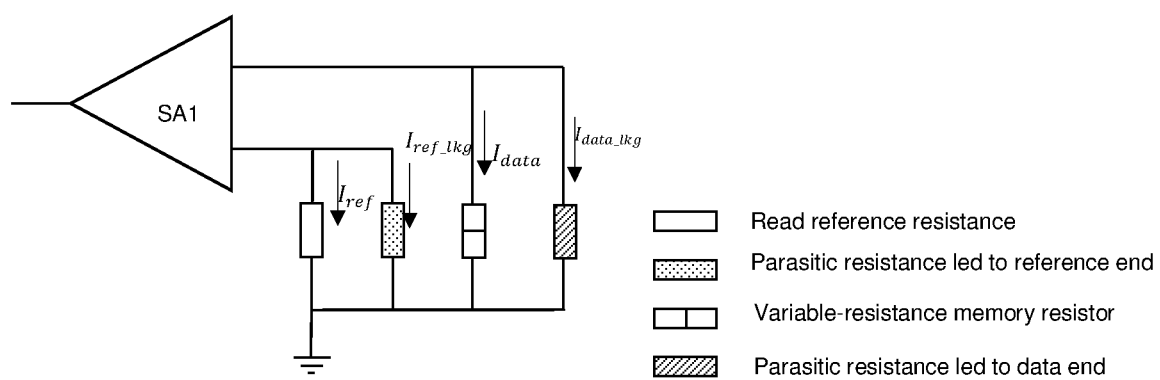
FIG. 6 is a simplified schematic diagram of a read circuit of a memory according to an example of the present disclosure.

In other words, a circuit principle of FIG. 5 may be simplified to a structure in FIG. 6. A current at the data end (input negative end) of the first current sense amplifier SA1 is $I_{data}=I_{data}+(y-1)*I_{1kg\_data}((y-1)*I_{1kg\_data}=I_{dtat\_1kg})$. A current at the reference end of the first current sense amplifier SA1 is $I_{ref}=I_{ref}+y*I_{1kg\_ref}(y*I_{1kg\_rer}=I_{ref\_1kg})$. Conditions under which bit data is accurately indicated are $I_{data\_HR}+(y-1)*I_{lkg\_data}<I_{ref}+y*I_{1kg\_ref}<I_{data\_LR}+(y-1)*I_{1kg\_data}$, and $I_{1kg\_data}=I_{1kg\_ref}$. When y is larger, $I_{data\_HR} < I_{ref} < I_{data\_LR}$; where $I_{data}$ is a current accumulated on the first bit line by the target storage bit; $I_{ref}$ is the reference current; $I_{1kg\_ref}$ is a current accumulated on the second bit line by one storage bit; $I_{data\_HR}$ is a current accumulated on the first bit line by the target storage bit when the target storage bit is in a high-resistance state; and $I_{data\_LR}$ is a current accumulated on the first bit line by the target storage bit when the target storage bit is in a low-resistance state.

The disclosure further provides a memory, including a plurality of storage arrays and any one of the read circuits of a memory described above.

As an alternative example, the memory is a phase change memory, a magnetic random-access memory or a resistive random-access memory.

Reference is made to the above example of the reading circuit for description of the memory provided in the disclosure, which will not be repeated herein.

It should be noted that in the specification, the relation terms, for example, first, second, etc., are used merely for distinguishing one entity or operation from another entity or operation but do not necessarily require or imply that there are any actual relation or sequence between these entities or operations. Moreover, the terms "include", "comprise", or their any other variations are intended to cover non-exclusive inclusions, such that a process, a method, an article, or an apparatus including a series of elements not only includes those elements, but also includes other elements that are not explicitly listed, or also includes inherent elements of the process, the method, the article, or the apparatus. In the case of no more limitations, the element limited by the sentence "comprising a . . . " and "including a . . . " does not exclude another same element in the process, method, merchandise or apparatus including the element.

The above description of the disclosed examples helps those skilled in the art to implement or use the present disclosure. Various modifications to these examples will be readily apparent to those skilled in the art, and generic principles defined herein may be implemented in other examples without departing from the spirit or scope of the present disclosure. Thus, the present disclosure is not to be limited to the examples shown herein but is to be accorded the widest scope consistent with the principles and novel features disclosed herein.

What is claimed is:

1. A read circuit of a memory, applied to the memory comprising a plurality of storage arrays, wherein each of the plurality of storage arrays comprises a first array and a second array structurally symmetrical to the first array; the read circuit of the memory comprises a plurality of bit read circuits corresponding one-to-one to the plurality of storage arrays; and each of the plurality of bit read circuits comprises:
   a word line control circuit and a bit line control circuit separately connected to a target storage array correspondingly read; and
   a current comparison circuit connected to the bit line control circuit,
   wherein the word line control circuit is connected to word lines of a first target array and word lines of a second target array in the target storage array separately, and is configured to control a target word line where a target storage bit to be selected is located to close a first switching tube in the target storage bit; and
   the bit line control circuit is connected to bit lines of the first target array and bit lines of the second target array separately, and is configured to control a first bit line where the target storage bit is located and a second bit line which is structurally symmetrical to the first bit line to be connected.

2. The read circuit of the memory according to claim 1, wherein the bit line control circuit comprises:
   a plurality of second switching tubes arranged on a plurality of the bit lines of the first target array and a plurality of the bit lines of the second target array one by one, wherein a first end of each second switching tube is connected to a source of a storage bit of a bit line where the second switching tube is arranged, and a second end of the each second switching tube is connected to the current comparison circuit; and
   a switching control circuit connected to control ends of the plurality of the second switching tubes separately, and configured to control the second switching tubes arranged on the first bit line and the second bit line to be closed, so as to connect the first bit line to the second bit line.

3. The read circuit of the memory according to claim 2, wherein the current comparison circuit comprises:
   a first current comparison sub-circuit connected to the second ends of the plurality of second switching tubes separately, configured to enter an operating state when the target storage bit is located in the first target array, so as to obtain a first current on the first bit line and a second current on the second bit line, and configured to generate a first signal indicating that a stored value of the target storage bit is 1 in case that a current value obtained by superimposing a preset reference current on the second current is greater than the first current, and otherwise, generate a second signal indicating that the stored value of the target storage bit is 0; and
   a second current comparison sub-circuit connected to the second ends of the plurality of second switching tubes separately, configured to enter an operating state when the target storage bit is located in the second target array, so as to obtain the first current and the second current, and configured to generate the first signal in case that a current value obtained by superposing the preset reference current on the second current is greater than the first current, and otherwise, generate the second signal.

4. The read circuit of the memory according to claim 3, wherein the first current comparison sub-circuit comprises a first switching device, a second switching device, a first reference resistor, and a first current sense amplifier, wherein
   a first end of the first switching device is connected to the second ends of the plurality of second switching tubes corresponding to the first target array separately, a second end of the first switching device is connected to a negative input end of the first current sense amplifier, a first end of the second switching device is connected to the second ends of the plurality of second switching tubes corresponding to the second target array separately, a second end of the second switching device is connected to a positive input end of the first current sense amplifier and a first end of the first reference resistor separately, and a second end of the first reference resistor is grounded; the first switching device and the second switching device are closed when the target storage bit is located in the first target array and are opened when the target storage bit is located in the second target array; and
   the first current sense amplifier is configured to output a high level signal indicating that the stored value of the target storage bit is 1 in case that a current at the positive input end of the first current sense amplifier is greater than a current at the negative input end of the first current sense amplifier, and otherwise, output a low level signal indicating that the stored value of the target storage bit is 0.

5. The read circuit of the memory according to claim 4, wherein the first current comparison sub-circuit further comprises a third switching tube and a fourth switching tube, wherein
   a first end of the third switching tube is connected to the second end of the first switching device, a second end of the third switching tube is connected to the negative input end of the first current sense amplifier, a control end of the third switching tube is connected to a first voltage, a first end of the fourth switching tube is connected to the first end of the first reference resistor and the second end of the second switching device separately, a second end of the fourth switching tube is connected to the positive input end of the first current sense amplifier, and a control end of the fourth switching tube is connected to a second voltage; and resistance values on lines where the third switching tube and the fourth switching tube are located are correspondingly adjusted by adjusting the first voltage and the second voltage.

6. The read circuit of the memory according to claim 4, wherein the second current comparison sub-circuit comprises a third switching device, a fourth switching device, a second reference resistor, and a second current sense amplifier, wherein
   a first end of the third switching device is connected to the second ends of the plurality of second switching tubes corresponding to the second target array separately, a second end of the third switching device is connected to a negative input end of the second current sense amplifier, a first end of the fourth switching device is connected to the second ends of the plurality of second switching tubes corresponding to the first target array separately, a second end of the fourth switching device is connected to a positive input end of the second current sense amplifier and a first end of the second reference resistor separately, and a second end of the second reference resistor is grounded; the third switching device and the fourth switching device are closed when the target storage bit is located in the second target array and are opened when the target storage bit is located in the first target array; and
   the second current sense amplifier is configured to output a high level signal indicating that the stored value of the target storage bit is 1 in case that a current at the positive input end of the second current sense amplifier is greater than a current at the negative input end of the second current sense amplifier, and otherwise, output a low level signal indicating that the stored value of the target storage bit is 0.

7. The read circuit of the memory according to claim 6, wherein the second current comparison sub-circuit further comprises a fifth switching tube and a sixth switching tube, wherein
   a first end of the fifth switching tube is connected to the second end of the third switching device, a second end of the fifth switching tube is connected to the negative input end of the second current sense amplifier, a control end of the fifth switching tube is connected to the first voltage, a first end of the sixth switching tube is connected to the first end of the second reference resistor and the second end of the fourth switching device separately, a second end of the sixth switching tube is connected to the positive input end of the second current sense amplifier, and a control end of the sixth switching tube is connected to the second voltage; and resistance values on lines where the fifth switching tube and the sixth switching tube are located are correspondingly adjusted by adjusting the first voltage and the second voltage.

8. The read circuit of the memory according to claim 6, wherein the first switching device, the second switching device, the third switching device and the fourth switching device are transmission gates.

9. A memory, comprising: a plurality of storage arrays; and a read circuit, wherein each of the plurality of storage arrays comprises a first array and a second array structurally symmetrical to the first array; the read circuit of the memory comprises a plurality of bit read circuits corresponding one-to-one to the plurality of storage arrays; and each of the plurality of bit read circuits comprises:
   a word line control circuit and a bit line control circuit separately connected to a target storage array correspondingly read; and
   a current comparison circuit connected to the bit line control circuit,
   wherein the word line control circuit is connected to word lines of a first target array and word lines of a second target array in the target storage array separately, and is configured to control a target word line where a target storage bit to be selected is located to close a first switching tube in the target storage bit; and
   the bit line control circuit is connected to bit lines of the first target array and bit lines of the second target array separately, and is configured to control a first bit line where the target storage bit is located and a second bit line which is structurally symmetrical to the first bit line to be connected.

10. The memory according to claim 9, being a phase change memory, a magnetic random-access memory or a resistive random-access memory.

11. The read circuit of the memory according to claim 5, wherein the second current comparison sub-circuit comprises a third switching device, a fourth switching device, a second reference resistor, and a second current sense amplifier, wherein
   a first end of the third switching device is connected to the second ends of the plurality of second switching tubes corresponding to the second target array separately, a second end of the third switching device is connected to a negative input end of the second current sense amplifier, a first end of the fourth switching device is connected to the second ends of the plurality of second switching tubes corresponding to the first target array separately, a second end of the fourth switching device is connected to a positive input end of the second current sense amplifier and a first end of the second reference resistor separately, and a second end of the second reference resistor is grounded; the third switching device and the fourth switching device are closed when the target storage bit is located in the second target array and are opened when the target storage bit is located in the first target array; and
   the second current sense amplifier is configured to output a high level signal indicating that the stored value of the target storage bit is 1 in case that a current at the positive input end of the second current sense amplifier is greater than a current at the negative input end of the second current sense amplifier, and otherwise, output a low level signal indicating that the stored value of the target storage bit is 0.

12. The memory according to claim 9, wherein the bit line control circuit comprises:
a plurality of second switching tubes arranged on a plurality of the bit lines of the first target array and a plurality of the bit lines of the second target array one by one, wherein a first end of each second switching tube is connected to a source of a storage bit of a bit line where the second switching tube is arranged, and a second end of the each second switching tube is connected to the current comparison circuit; and
a switching control circuit connected to control ends of the plurality of the second switching tubes separately, and configured to control the second switching tubes arranged on the first bit line and the second bit line to be closed, so as to connect the first bit line to the second bit line.

13. The memory according to claim 12, wherein the current comparison circuit comprises:
a first current comparison sub-circuit connected to the second ends of the plurality of second switching tubes separately, configured to enter an operating state when the target storage bit is located in the first target array, so as to obtain a first current on the first bit line and a second current on the second bit line, and configured to generate a first signal indicating that a stored value of the target storage bit is 1 in case that a current value obtained by superimposing a preset reference current on the second current is greater than the first current, and otherwise, generate a second signal indicating that the stored value of the target storage bit is 0; and
a second current comparison sub-circuit connected to the second ends of the plurality of second switching tubes separately, configured to enter an operating state when the target storage bit is located in the second target array, so as to obtain the first current and the second current, and configured to generate the first signal in case that a current value obtained by superposing the preset reference current on the second current is greater than the first current, and otherwise, generate the second signal.

14. The memory according to claim 13, wherein the first current comparison sub-circuit comprises a first switching device, a second switching device, a first reference resistor, and a first current sense amplifier, wherein
a first end of the first switching device is connected to the second ends of the plurality of second switching tubes corresponding to the first target array separately, a second end of the first switching device is connected to a negative input end of the first current sense amplifier, a first end of the second switching device is connected to the second ends of the plurality of second switching tubes corresponding to the second target array separately, a second end of the second switching device is connected to a positive input end of the first current sense amplifier and a first end of the first reference resistor separately, and a second end of the first reference resistor is grounded; the first switching device and the second switching device are closed when the target storage bit is located in the first target array and are opened when the target storage bit is located in the second target array; and
the first current sense amplifier is configured to output a high level signal indicating that the stored value of the target storage bit is 1 in case that a current at the positive input end of the first current sense amplifier is greater than a current at the negative input end of the first current sense amplifier, and otherwise, output a low level signal indicating that the stored value of the target storage bit is 0.

15. The memory according to claim 14, wherein the first current comparison sub-circuit further comprises a third switching tube and a fourth switching tube, wherein
a first end of the third switching tube is connected to the second end of the first switching device, a second end of the third switching tube is connected to the negative input end of the first current sense amplifier, a control end of the third switching tube is connected to a first voltage, a first end of the fourth switching tube is connected to the first end of the first reference resistor and the second end of the second switching device separately, a second end of the fourth switching tube is connected to the positive input end of the first current sense amplifier, and a control end of the fourth switching tube is connected to a second voltage; and resistance values on lines where the third switching tube and the fourth switching tube are located are correspondingly adjusted by adjusting the first voltage and the second voltage.

16. The memory according to claim 14, wherein the second current comparison sub-circuit comprises a third switching device, a fourth switching device, a second reference resistor, and a second current sense amplifier, wherein
a first end of the third switching device is connected to the second ends of the plurality of second switching tubes corresponding to the second target array separately, a second end of the third switching device is connected to a negative input end of the second current sense amplifier, a first end of the fourth switching device is connected to the second ends of the plurality of second switching tubes corresponding to the first target array separately, a second end of the fourth switching device is connected to a positive input end of the second current sense amplifier and a first end of the second reference resistor separately, and a second end of the second reference resistor is grounded; the third switching device and the fourth switching device are closed when the target storage bit is located in the second target array and are opened when the target storage bit is located in the first target array; and
the second current sense amplifier is configured to output a high level signal indicating that the stored value of the target storage bit is 1 in case that a current at the positive input end of the second current sense amplifier is greater than a current at the negative input end of the second current sense amplifier, and otherwise, output a low level signal indicating that the stored value of the target storage bit is 0.

17. The memory according to claim 16, wherein the second current comparison sub-circuit further comprises a fifth switching tube and a sixth switching tube, wherein
a first end of the fifth switching tube is connected to the second end of the third switching device, a second end of the fifth switching tube is connected to the negative input end of the second current sense amplifier, a control end of the fifth switching tube is connected to the first voltage, a first end of the sixth switching tube is connected to the first end of the second reference resistor and the second end of the fourth switching device separately, a second end of the sixth switching tube is connected to the positive input end of the second current sense amplifier, and a control end of the sixth switching tube is connected to the second voltage; and resistance values on lines where the fifth switching tube and the sixth switching tube are located are correspondingly adjusted by adjusting the first voltage and the second voltage.

18. The memory according to claim 16, wherein the first switching device, the second switching device, the third switching device and the fourth switching device are transmission gates.

* * * * *